July 28, 1942.　　　　W. A. SCOTT　　　　2,291,172
COUPLING FOR CONNECTING FLUID-CONVEYING TUBULAR MEMBERS
Filed Sept. 24, 1941
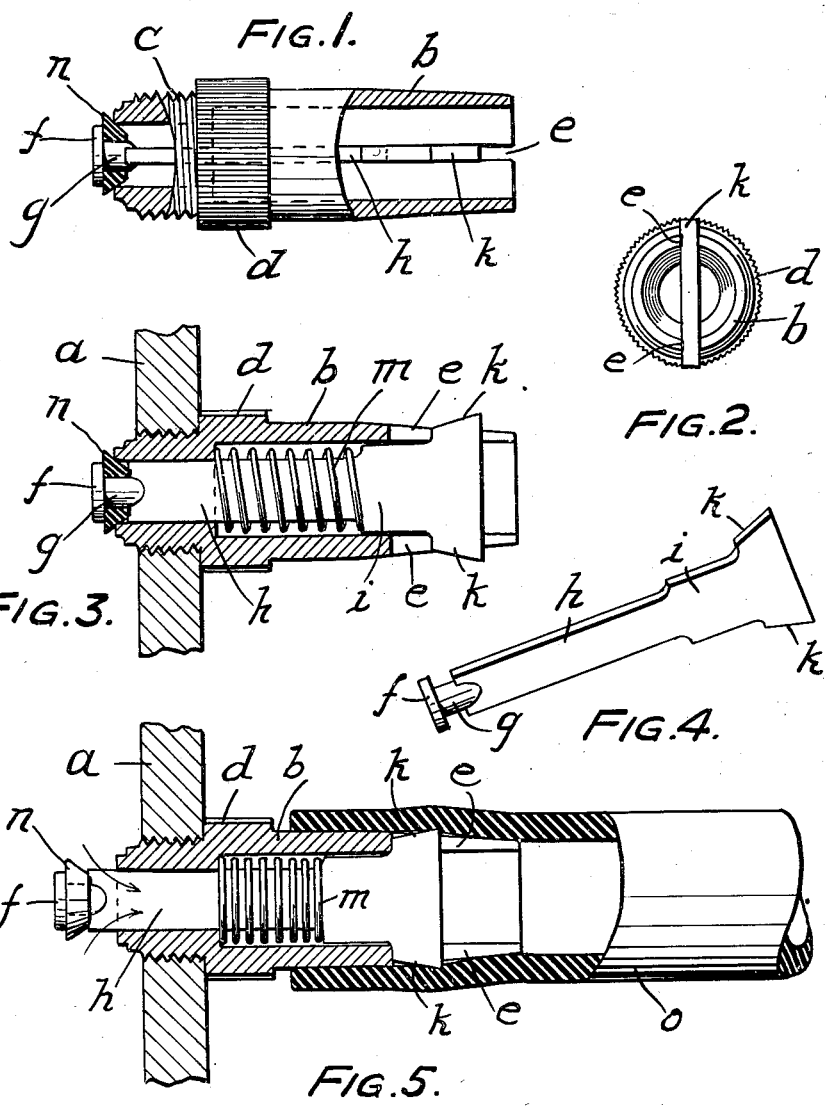
WITNESS:
INVENTOR
Walter A. Scott
BY
Busser and Harding
ATTORNEYS.

Patented July 28, 1942

2,291,172

UNITED STATES PATENT OFFICE 2,291,172

COUPLING FOR CONNECTING FLUID-CONVEYING TUBULAR MEMBERS

Walter A. Scott, Poughkeepsie, N. Y., assignor to The De Laval Separator Company, New York, N. Y., a corporation of New Jersey Application September 24, 1941, Serial No. 412,060

5 Claims. (Cl. 284—13)

My invention relates to means whereby the end of a flexible and elastic fluid-carrying tube may be slipped over a normally closed tubular member of rigid material and thereby open fluid connection between them. It finds practical use, for example, in connecting a liquid-carrying rubber tube with the nozzle of a solution rack for sterilizing milking machine equipment and in connecting a rubber tube connected with a source of vacuum with a vacuum operated milking machine unit; although it is obviously adapted for other uses.

The object of the invention is to provide a coupling comprising a cock which is normally held closed by spring pressure but which may be opened and held open against the spring pressure by sliding thereon the rubber tube, and which will again securely close upon the withdrawal of the rubber tube. A further object of the invention is to provide a cock containing no elements which require threading together. Another object of the invention is to provide a cock in which the valve element and the spring compression means are formed in one piece. Another object of the invention is to provide a gasket which not only securely seals the valve when the latter is in closed position but also retains the valve in position. A general object of the invention may be said to be the provision of a simple, reliable and inexpensive construction which may be readily and quickly assembled.

A preferred embodiment of the invention is shown in the drawing, in which—

Fig. 1 is a longitudinal cross-section of the cock, the valve member being closed.

Fig. 2 is an end view of Fig. 1.

Fig. 3 is a view, similar to Fig. 1, but taken at an angle of 90° thereto.

Fig. 4 is a perspective view of the valve member of the cock.

Fig. 5 is a view similar to Fig. 2, but showing the valve member open after the flexible tube has been slipped over the nozzle member of the cock.

The cylindrical member $b$ may be provided at one end with a screw thread $c$ whereby it may be secured to a screw-threaded opening in the wall $a$ of any vessel with which it is desired to make connection and, if and when so applied, may be considered to be the nozzle member of the cock. Adjacent the thread $c$ is a knurled section $d$, preferably of somewhat greater exterior diameter than the remainder of the nozzle, to facilitate the attachment and detachment of the nozzle to the wall $a$. The other or free end of the nozzle is of an outer diameter less than the part thereof adjacent the knurl $d$, such diameter gradually decreasing toward the free end of the nozzle from, preferably, a point between the knurl and such free end. The interior diameter of the nozzle may be uniform from its free end to near its opposite end, the remainder of the nozzle being of reduced interior diameter. From the free end of the nozzle extend longitudinally two diametrically opposite slots $e$.

The valve member of the cock comprises a stem shaped as a flat bar having at one end a circular neck $g$ and a disc-shaped head $f$. The section $h$ of the stem adjacent the neck $g$ approximates the diameter of the head $f$ and both are adapted to slide freely through the reduced inner diameter end of the nozzle. Beyond section $h$ of the stem is a section $i$ of greater width having a free sliding fit in the part of the nozzle of larger inner diameter. The end of the stem beyond section $i$ comprises wings $k$ whose lateral edges extend at an angle to the axis of the cock outward to the extremity of the stem, which is of a width substantially greater than the outer diameter of the free end of the nozzle.

In assembling the cock, a coil spring $m$ is slipped over the section $h$ of the valve stem and the valve is inserted by hand into the nozzle through the slotted end thereof, the wings being aligned with the slots $e$. The spring $m$ is now confined between the annular shoulder at the junction of the larger and smaller inner diameter sections of the nozzle and the shoulders at the junction of the narrower and wider sections ($h$ and $i$) of the valve stem. The valve member is now forced further into the nozzle so that the head $f$ and neck $g$ project substantially beyond the end of the nozzle, thereby compressing the spring between the tube shoulder and the valve stem shoulders above mentioned. While the valve member, with the spring compressed, is so held in the nozzle, a rubber washer $n$ is slipped over the head $f$ and held on the neck $g$ immediately back of the neck. The washer $n$ has a bevelled periphery, the larger diameter part of which is substantially greater than the inner diameter of the reduced diameter part of the nozzle. Upon release of the end pushing pressure against the valve member, the spring retracts the valve member to cause the washer $n$ to engage the end of the nozzle, thereby closing the cock; the spring being still under a tension which, though reduced, suffices to hold the washer in sealing engagement with the nozzle, To afford fluid connection between the nozzle and the fluid-transmitting rubber tube o, the latter is merely forcibly slipped over the free end of the nozzle. The tube o is of such diameter that it will grip the wings k and force the valve member into the position shown in Fig. 5, thereby opening the cock. The rubber tube will, in this position, have so tight a fit on the nozzle that it will remain in the position into which it is forcibly slipped and hold the cock open until it is forcibly withdrawn, whereupon the spring returns the valve member to its closing position.

Characteristic features of the improved coupling are: the valve element and the spring-compressing device are formed in one piece; the gasket not only acts as such, but serves to retain the valve in position; and there are no elements in the coupling per se required to be threaded together.

What I claim and desire to protect by Letters Patent is:

1. In a coupling of the type comprising a tubular member having at one end a valve seat, a valve member insertable into said tubular member, a spring confined between the valve member and the tubular member and having a tension sufficient to retract the valve stem into valve closing position, and means at the end opposite the valve seat adapted to be engaged by the end of a connecting tube slipped over the corresponding end of the tubular member to thereby, against the tension of the spring, push and hold the valve member into valve opening position, said spring acting to retract the valve member into valve closing position when said connecting tube is withdrawn from engagement with said tubular member; the improvement in which the valve member comprises a valve stem and at one end thereof a head integral therewith, said stem being of such width and said head of such diameter as to allow said stem and head to be inserted into the end of the tubular member opposite the valve seat and to be moved longitudinally therein until said head projects well beyond said valve seat, and a washer of flexible material adapted to be stretched over said head and positioned back thereof and contracted tightly around said stem, said washer being of greater diameter than said head and the inner diameter of the corresponding end of the tubular member and constituting the valve proper.

2. A coupling comprising a tubular member having one end of reduced diameter and slotted at its other and wider end and having at the extremity of its reduced end a valve seat, a valve member insertable into said tubular member, a spring confined between the valve member and the tubular member and having a tension sufficient to retract the valve member into valve closing position, said valve member comprising a relatively narrow section slidable in the reduced inner diameter end of the tubular member, a relatively wide section slidable in the larger diameter part of the tubular member and a still wider extremity slidable in said slotted part of the tubular member and projecting above its outer face, said widest extremity being adapted to be engaged by the end of a flexible and elastic tube forcibly slipped over the larger diameter end of the tubular member to thereby, against the tension of the spring, push and hold the valve member into valve opening position, said spring acting to retract the valve member into valve closing position when said connecting tube is withdrawn from engagement with said tubular member; a neck and head integral therewith projecting beyond the extremity of the narrow section of the valve member, said head being of such diameter as to allow it to pass through the reduced diameter end of the tubular member when the narrow section of the valve member is inserted therein until said head projects well beyond said valve seat, and a washer of flexible material adapted to be stretched over said head and positioned back thereof and stretched tightly around said neck, said washer being of greater diameter than said head and the inner diameter of the corresponding end of the tubular member and constituting the valve proper.

3. The construction defined in claim 2 in which the slotted end of the tubular member comprises two diametrically opposite slots extending longitudinally from the extremity of the tubular member and in which the wide extremity of the valve stem adapted to be engaged by said flexible and elastic tube consists of diametrically opposite wings slidable in said slots, the opposite edges of the wings extending outward at an angle to the axis of the cock and above the outer face of the tubular member.

4. The construction defined in claim 2 in which the valve stem is a flat bar having shoulders connecting the said narrow section and the adjacent wider section and in which the said spring is confined between said shoulders and the annular shoulder at the junction of the wider and narrower inner diameter sections of the tubular member.

5. The construction defined in claim 2 in which the slotted end of the tubular member comprises two diametrically opposite slots extending longitudinally from the extremity of the tubular member and in which the valve stem is a flat bar having shoulders connecting the said narrower section and the adjacent wider section and shoulders connecting the last named section and its still wider extremity, the said wide extremity consisting of two diametrically opposite wings slidable in said slots and whose opposite edges extend outward at an angle to the axis of the cock and above the outer face of the tubular member thereof, said spring being confined between the first named shoulders and the annular shoulder at the junction of the wider and narrower inner diameter sections of the tubular member, the second named shoulders limiting the extent of the valve unseating movement by abutting against the closed ends of said slots.

WALTER A. SCOTT.